United States Patent [19]

Luce

[11] Patent Number: 4,896,630
[45] Date of Patent: Jan. 30, 1990

[54] ANIMAL SAFETY SEAT BELT

[75] Inventor: Therese G. Luce, 311 Garden Ter., Pottawattomie Park, Michigan City, Ind. 46360

[73] Assignee: Therese G. Luce, Michigan City, Ind.

[21] Appl. No.: 202,781

[22] Filed: Jun. 3, 1988

[51] Int. Cl.4 ............................................. A01K 29/00
[52] U.S. Cl. ...................................................... 119/96
[58] Field of Search .......................... 119/96, 106, 109

[56] References Cited

U.S. PATENT DOCUMENTS

| | | | |
|---|---|---|---|
| 1,508,601 | 9/1924 | Huff | 119/96 |
| 1,614,083 | 1/1927 | Plantico | 119/96 |
| 2,132,556 | 10/1938 | Blackshaw | 119/96 |
| 3,310,034 | 3/1967 | Dishart | 119/106 |
| 4,597,539 | 7/1986 | Moorman | 119/96 X |
| 4,676,198 | 6/1987 | Murray | 119/96 |
| 4,715,618 | 12/1987 | Harris | 119/96 X |

FOREIGN PATENT DOCUMENTS

| | | | |
|---|---|---|---|
| 1174917 | 9/1984 | Canada | 119/96 |
| 8800450 | 1/1988 | European Pat. Off. | 119/96 |

Primary Examiner—Gene Mancene
Assistant Examiner—R. Thomas Price
Attorney, Agent, or Firm—Myers & Ehrlich, Ltd.

[57] ABSTRACT

An animal safety seat belt disclosed herein includes, an upper and a lower restraint, a front and a rear strap, and a securement strap. Each is fabricated from woven webbing. The upper restraint is of predetermined length having a plurality of loops for inserting the straps therethrough and is adapted to be disposed adjacent the spine of the animal. The lower restraint is of predetermined length having a plurality of loops for inserting the straps therethrough and is adapted to be disposed adjacent the stomach and chest of the animal. The front strap is secured to the upper and lower restraints by being passed through forward loops. A buckle, disposed to an end of the front strap, adjusts the front loop circumference. The rear strap is attached to a rearward loop of said upper restraint and a corresponding loop of said lower restraint and also has a buckle for adjusting the circumference of a rear loop. The securement strap is affixed to the rear of a restraint for securing it to a structural member of a vehicle and also includes a buckle for adjusting the circumference of a securement loop.

20 Claims, 2 Drawing Sheets

ANIMAL SAFETY SEAT BELT

BACKGROUND OF THE INVENTION

The animal safety seat belt of the present invention relates to animal harness and particularly relates to animal safety harness.

Both harness and safety harness are the subject of issued patents. U.S. Pat. Nos. 4,676,198 (to Murray); 3,310,034 (to Dishart) describe safety harness (but note FIG. 3 of Murray and 9 of Dishart) primarily adapted to utilize the vehicle safety restraints for persons with safety harness. U.S. Pat. No. 1,614,083 (to Plantico) describes a dog harness. Dishart and Plantico show buckles inter-fitting with holes in longitudinal members which may be adjusted to a limited degree to accommodate the differing lengths of animals. It is not apparent that Murray is adjustable. It is desirable to have safety harness adjustable over a wider range of animal lengths and girths while preserving the strength of the longitudinal members as much as possible.

SUMMARY OF THE INVENTION

An animal safety seat belt includes an upper and a lower restraint, a front and a rear strap, and securement means. The upper restraint is of predetermined length having at least three upper attachment means for attaching straps and is adapted to be disposed adjacent the spine of the animal.

The lower restraint is of predetermined length having at least three lower attachment means for attaching straps and is adapted to be disposed adjacent the stomach and chest of the animal.

The front strap is secured to the upper and lower restraints by being passed through loops acting as attachment means. Adjustable loop means for adjusting the circumference of a front loop is disposed to an end of the front strap. The rear strap is attached to a rearward attachment means of said upper restraint and a corresponding attachment means of said lower restraint and also has an adjustable loop means. The securement means is affixed to the rear of a restraint for securing the animal to a structural member of a vehicle.

DETAILED DESCRIPTION OF THE DRAWINGS

Figure 1:
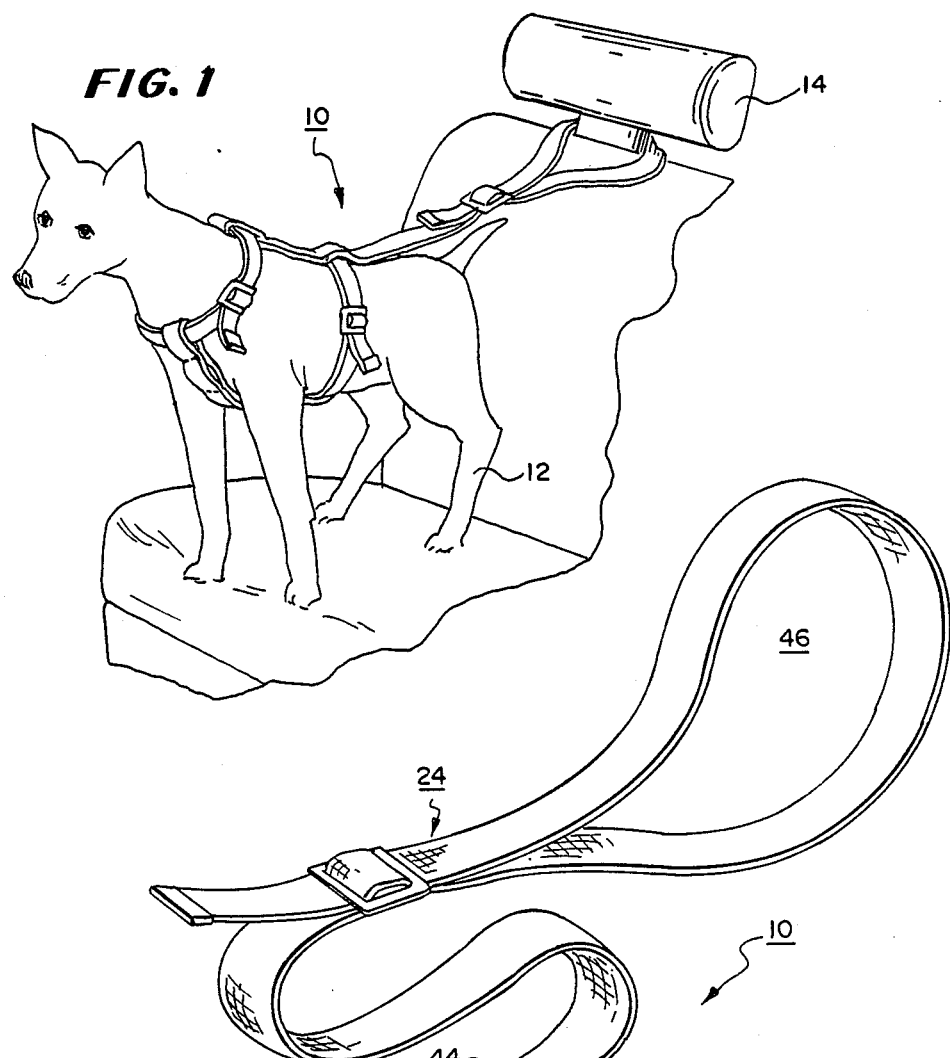
FIG. 1 is a perspective view of the animal safety seat belt of the present invention showing a restrained dog in a vehicle seat.

FIG. 1 shows the animal safety seat belt 10 of the present invention restraining a dog 12 by being secured to a head rest 14 of a vehicle. Head rest 14 has sufficient strength to be considered a structural element of the vehicle.

Figure 2:
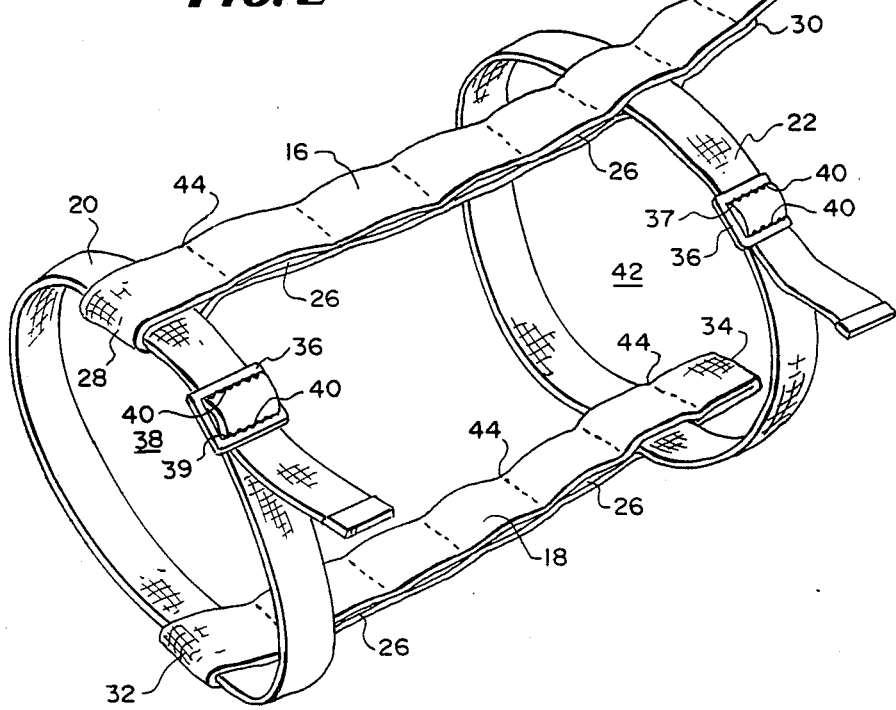
FIG. 2 is an enlarged perspective view of the invention.

As better seen in FIG. 2 the animal seat belt 10 includes an upper restraint 16, a lower restraint 18, a front strap 20, a rear strap 22 and securement means 24. Preferably restraints 16, 18, straps 20, 22 and securement means 24 are each fabricated from a woven webbing. The use of woven webbing tends to better absorb shock loads and facilitate the stability of the seat belt fitting on an animal.

Upper restraint 16 has loops 26 extending through restraint 16 disposed at preferably even intervals between upper front end 28 and upper rear end 30 to serve as upper attachment means. Similarly, lower restraint 18 has loops 26 extending through restraint 18 disposed at even intervals between lower front end 32 and lower rear end 34 to serve as lower attachment means. Loops 26 extend transversely to the lengths of restraints 16 and 18. Front strap 20 is secured to upper restraint 16 by being inserted through a loop 26 adjacent upper front end 28. Similarly, front strap 20 is secured to lower restraint 18 by being inserted through a loop 26 adjacent lower front end 32. Webbing buckle 36 is secured near an end of front strap 20 to serve as adjustable loop means to vary the size of front loop 38. The circumference of front loop 38 should be adjusted to fit snugly about the neck of a restrained animal. Webbing buckle 36 defines webbing orifices 37, 39 for receiving strap 20, and the stability of adjustment is enhanced by opposed teeth 40 in each orifice 37, 39 engaging the webbing of front strap 20 to oppose strap movement in either direction. Rear strap strap 22 is secured to upper restraint 16 by being inserted through a loop 26 towards the upper rear end 30 of upper restraint 16. Similarly, rear strap 22 is secured to lower restraint 18 by being inserted through a corresponding loop 26 towards the lower rear end 34 of lower restraint 18. The corresponding loops 26 should be chosen to place rear strap 22 near the animal's chest and stomach. The exact longitudinal placement of strap may be varied by selecting loops 26 for optimum positioning on the animal. Webbing buckle 36 is secured to an end of rear strap 22 to serve as adjustable loop means to vary the size of rear loop 42. The circumference of rear loop 42 should be adjusted to fit snugly about the body of the restrained animal in a manner similar to front loop 38.

Upper restraint 16 and lower restraint 18 are each fabricated from a double length of woven webbing with loops 26 formed by sewing the doubled length together at preselected intervals along the length of the restraints in stitchings 44. The length of a loop 26 should correspond to the width of straps 20 and 22. Stitchings 44 also add shock resistance to belt 10 by distributing the loads and tending to avoid catastrophic failure modes.

As shown in FIG. 2, securement means 24, or securement strap, is an integral continuance of upper restraint 16 and includes webbing buckle 36 serving as adjustable loop means. Webbing buckle 36 allows the securement to be fastened about a structural member of a vehicle and allows adjustment of securement loop 46. If desired seat belt 10 may be used as a leash to restrain an animal outside a vehicle with the orientation shown in FIG. 1. However, given the differing purposes of a leash and a seat belt, it is better to reverse the orientation of the front and rear of seat belt 10 on an animal, so that the rear strap 22 girds the neck and securement means 24 may better control animal movement.

Figure 3:
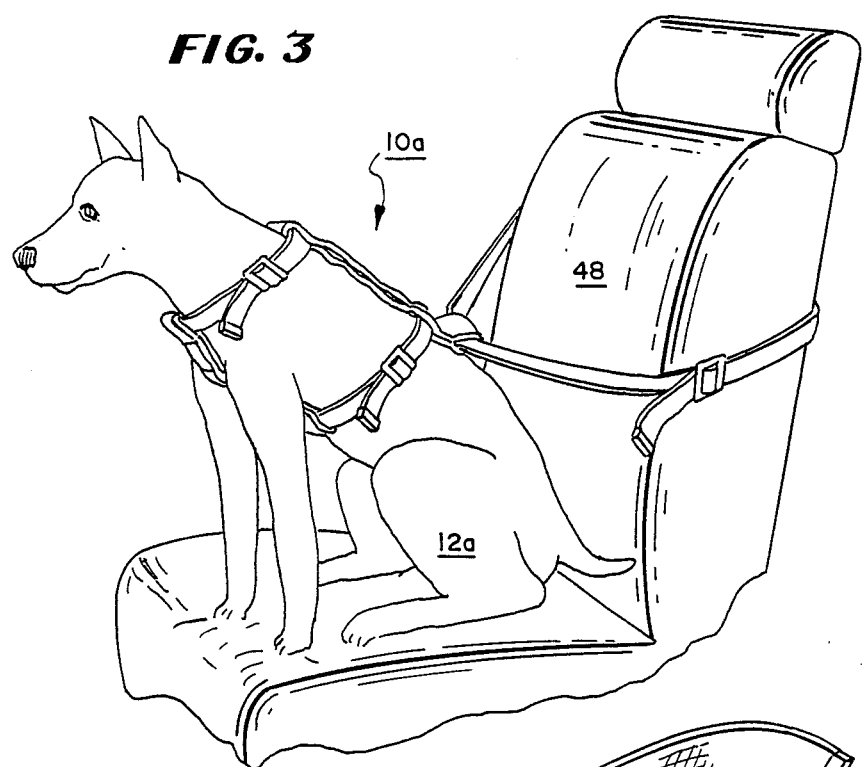
FIG. 3 is similar to FIG. 1 and shows an alternate embodiment of the animal safety seat belt of the present invention.
Figure 4:
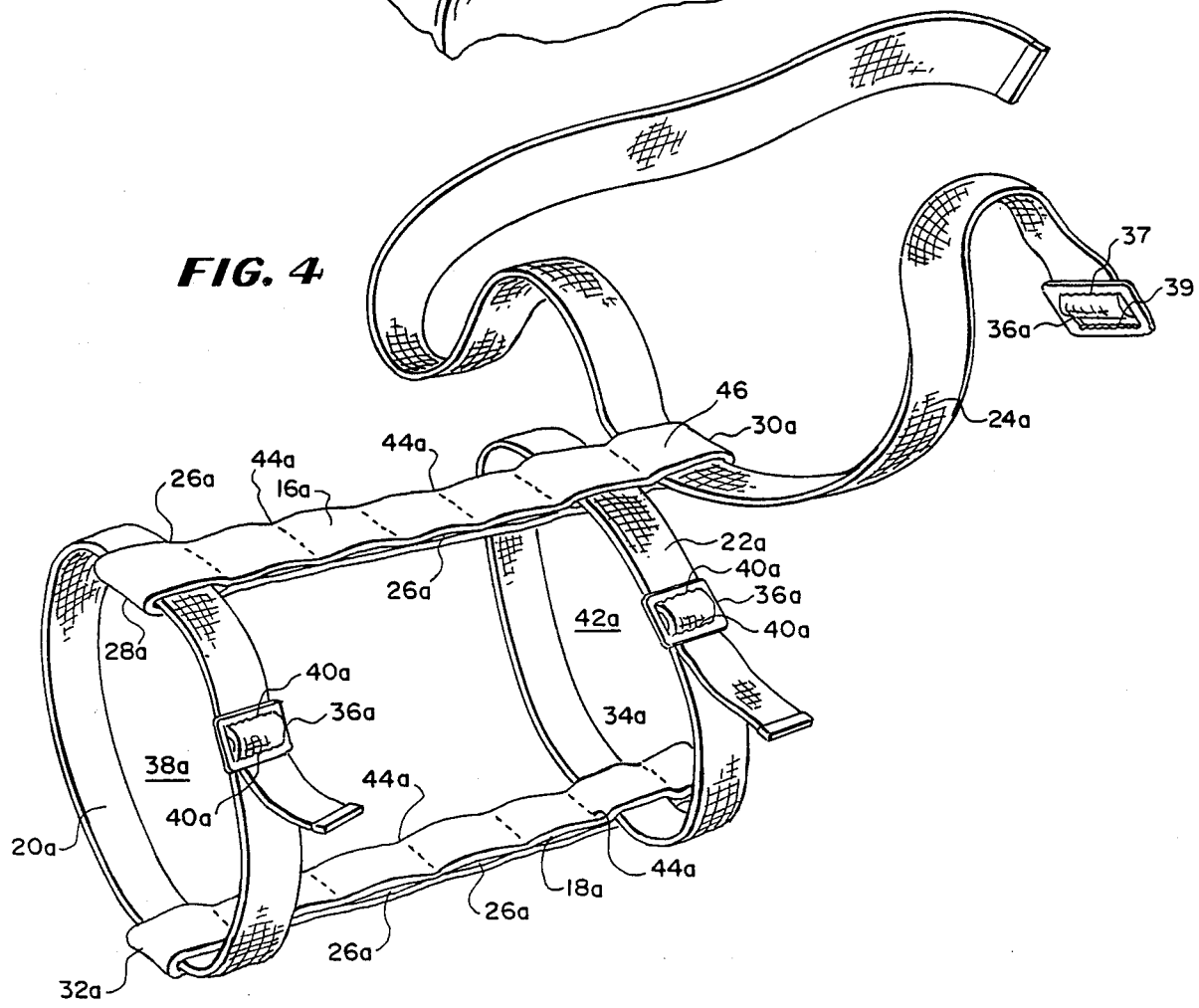
FIG. 4 is an enlarged perspective view of the embodiment of FIG. 3.

The embodiment of the invention shown in FIGS. 3 and 4 has similar elements to the embodiment above discussed. Similar elements are numbered as they are in FIGS. 1 and 2 with the suffix "a". The animal seat belt 10a includes an upper restraint 16a, a lower restraint 18a, a front strap 20a, a rear strap 22a and securement means 24a. Preferably restraints 16a, 18a, straps 20a, 22a and securement means 24a are each fabricated from a woven webbing. The use of woven webbing tends to better absorb shock loads and facilitates the stability of the seat belt fitting on an animal. Upper restraint 16a has loops 26a extending through restraint 16a disposed at preferably even intervals between upper front end 28a and upper rear end 30a to serve as upper attachment means. Similarly, lower restraint 18a has loops 26a extending through restraint 18a disposed at even intervals between lower front end 32a and lower rear end 34a to serve as lower attachment means. Loops 26a extend transversely to the lengths of restraints 16a and 18a. Front strap 20a is secured to upper restraint 16a by being inserted through a loop 26a adjacent upper front end 28a. Similarly, front strap 20a is secured to lower restraint 18a by being inserted through a loop 26a adjacent lower front end 32a. Webbing buckle 36a is secured near an end of front strap 20a to serve as adjustable loop means to vary the size of front loop 38a. The circumference of front loop 38a should be adjusted to fit snugly about the neck of a restrained animal. Webbing buckle 36a defines webbing orifices 37a, 39a for receiving strap 20a, and the stability of adjustment is enhanced by opposing teeth 40a engaging the webbing of front strap 20a to oppose strap movement in either direction. Rear strap 22a is secured to upper restraint 16a by being inserted through a loop 26a towards the upper rear end 30a of upper restraint 16a. Similarly, rear strap 22a is secured to lower restraint 18a by being inserted through a corresponding loop 26a towards the lower rear end 34a of lower restraint 18a. The corresponding loops 26a should be chosen to place the rear strap 22a near the animal's chest and stomach. The exact longitudinal placement of rear strap 22a may be varied by appropriately selecting loops 26a for optimum positioning on the animal. Webbing buckle 36a is secured to an end of rear strap 22a to serve as adjustable loop means to vary the size of rear loop 42a. The circumference of rear loop 42a should be adjusted to fit snugly about the body of the restrained animal in a manner similar to front loop 38a.

Upper restraint 16a and lower restraint 18a are each fabricated from a double length of woven webbing with loops 26a formed by sewing the doubled length together at preselected interval along the length of the restraints in stitchings 44a. The length of a loop 26a should correspond to the width of straps 20a and 22a. Stitchings 44a also adds shock resistance to belt 10a by distributing the loads and tending to avoid catastrophic failure modes.

This embodiment of animal safety seat belt 10a principally differs from the animal safety seat belt 10 in the provision of rearmost loop 46 and the non-integral securement means 24a. Securement means 24a includes webbing buckle 36a. Webbing buckle 36a allows the securement means to be fastened about a structural member of a vehicle and allows adjustment of securement loop 46a. FIG. 3 shows securement means 24a fastened about a passenger seat 48. If desired seat belt 10a may also be used as a leash to restrain an animal outside a vehicle. In this embodiment of seat belt 10a, securement means 24a may be readily removed from rear most loop 46 and the animal can freely roam without discomfort.

While various embodiments of the animal safety seat belt of the present invention have been described above, it is to be understood that additional variations and modifications can be made to the animal safety seat belt of the present invention without departing from the teachings of the present invention. Some of the advantages and features of the animal safety seat belt are discussed, others are inherent. Accordingly, the scope of the invention is only to be limited as necessitated by the accompanying claims.

I claim:

1. An animal safety seat belt comprising:
    an upper restraint of predetermined length having at least three upper attachment means for slidably attaching straps, said upper restraint adapted to be disposed adjacent the spine of the animal;
    a lower restraint of predetermined length having at least three lower attachment means for slidably attaching straps, said lower restraint adapted to be disposed adjacent the stomach and chest of the animal;
    a front strap including adjustable loop means for adjusting the circumference of a front loop, said front loop slidably attached to the most forward of said upper and said lower attachment means;
    a rear strap including adjustable loop means for adjusting the circumference of a rear loop, said rear loop slidably attached to a rearward attachment means of said upper restraint and a corresponding attachment means of said lower restraint;
    securement means affixed to the rear of a restraint rearward of said rear strap for securing said restraint to a structural member of vehicle and for maintaining a relatively fixed distance between said front and rear straps when force is applied to said restraining means;
    said restraints secured to the animal by said straps, whereby the animal is secured to structural member of said vehicle.

2. The seat belt of claim 1 wherein said attachment means are disposed at even intervals throughout the lengths of the restraints.

3. The seat belt of claim 1 wherein said attachment means are loops extending through said restraints transversely to the lengths of the restraints.

4. The seat belt of claim 3 wherein said restraints, straps, and securement means are woven webbing to absorb shock loads.

5. The seat belt of claim 4 wherein said adjustable loop means is a toothed webbing buckle defining two orifices for receiving webbing having teeth in each webbing orifice disposed in a direction to oppose movement of the webbing with respect to the webbing buckle.

6. The seat belt of claim 5 wherein said upper restraint has one more loop than the lower restraint disposed to the rear of said upper restraint; and said securement means is attached to said upper restraint by passing said securement means through the rearmost loop of said upper restraint.

7. The seat belt of claim 4 wherein said securement means includes an adjustable loop means for securing said securement means to a structural member of a vehicle.

8. The seat belt of claim 7 wherein said adjustable loop means is a toothed webbing buckle orifice having teeth disposed in a direction to oppose relative movement between the webbing of said securement means and the webbing buckle.

9. The seat belt of claim 8 wherein securement means and said upper restraint are a continuous length of webbing.

10. The seat belt of claim 9 wherein the continuous length of webbing is integral.

11. An animal safety seat belt comprising:

an upper restraint of predetermined length fabricated from woven webbing folded on itself for a greater portion of its length to be disposed along the animal's spine;

a lower restraint of predetermined length fabricated from woven webbing folded on itself for a greater portion of its length to be disposed along the animal's chest and stomach;

loops formed in said upper and lower restraint by stitching a length of the folded webbing transversely to the length of the restraints at corresponding predetermined intervals;

a front strap including adjustable loop means for adjusting the circumference of a front loop to be disposed adjacent the base of the animal's neck, said front strap attached to said restraints by being inserted through forward loops of said upper and said lower restraints;

a rear strap including adjusting loop means for adjusting the circumference of a rear loop to be disposed adjacent an animal's body near the abdominal region, said rear strap attached to said restraints by being inserted through a rearward loop of said upper restraint and corresponding loop of said lower restraint; and securement means affixed to the rear of a restraint for securing said restraint to a structural member of vehicle.

12. The seat belt of claim 11 wherein said loops are disposed at even intervals throughout the lengths of the restraints.

13. The seat belt of claim 11 wherein said straps and securement means are woven webbing.

14. The seat belt of claim 13 wherein said adjustable loop means is a toothed webbing buckle defining two orifices for receiving webbing having teeth in each webbing orifice disposed in a direction to oppose movement of the webbing with respect to the webbing buckle.

15. The seat belt of claim 13 wherein said upper restraint has one more loop than the lower restraint disposed to the rear of said upper restraint; and said securement means is attached to said upper restraint by passing said securement means through a rearward loop of said upper restraint.

16. The seat belt of claim 15 wherein said securement means includes an adjustable loop means for securing said securement means to a structural member of a vehicle.

17. The seat belt of claim 16 wherein said adjustable loop means is a toothed webbing buckle orifice having teeth disposed in a direction to oppose relative movement between the webbing of said securement means and the webbing buckle.

18. The seat belt of claim 17 wherein securement means and said upper restraint are a continous length of webbing.

19. The seat belt of claim 18 wherein the continuous length of webbing is integral.

20. An animal safety seat belt comprising:

an upper restraint of predetermined length fabricated from woven webbing folded on itself for a greater portion of its length to be disposed along the animal's chest and stomach;

loops formed in said upper and lower restraint by stitching a length of the folded webbing transversely to the length of the restraints at corresponding predetermined intervals and disposed at least in pairs at each end of the upper and lower restraints;

a front strap including adjustable loop means for adjusting the circumference of a front loop to be disposed adjacent the base of the animal's neck, said front strap attached to said restraints by being inserted through forward loops of said upper and said lower restraints;

a rear strap including adjustable loop means for adjusting the circumference of a rear loop to be disposed adjacent an animal's body near the abdominal region, said rear strap attached to said restraints by being inserted through a rearward loop of said upper restraint and corresponding loop of said lower restraint; and securement means including adjustable loop means affixed to the rear of a restraint rearward of said rear strap for adjustably and detachably securing said restraint to a structural member of vehicle and for maintaining a relatively fixed distance between said front and rear straps when force is applied to said restraining means.

* * * * *

UNITED STATES PATENT AND TRADEMARK OFFICE
CERTIFICATE OF CORRECTION

PATENT NO. : 4,896,630

DATED : January 30, 1990

INVENTOR(S) : Therese G. Luce

It is certified that error appears in the above-identified patent and that said Letters Patent is hereby corrected as shown below:

In Claim 20, Column 6, line 21 delete "chest and stomach" and substitute --spine-- therefore.

In Claim 20, Column 6, after line 21 and before line 22 insert paragraph --a lower restraint of predetermined length fabricated from woven webbing folded on itself for a greater portion of its length to be disposed along the animal's chest and stomach;--

Signed and Sealed this

Seventeenth Day of December, 1991

Attest:

HARRY F. MANBECK, JR.

*Attesting Officer*    *Commissioner of Patents and Trademarks*